Aug. 16, 1938.     G. N. BRUNKER     2,126,726
WEATHER STRIP FOR CLOSURES
Filed Dec. 23, 1936
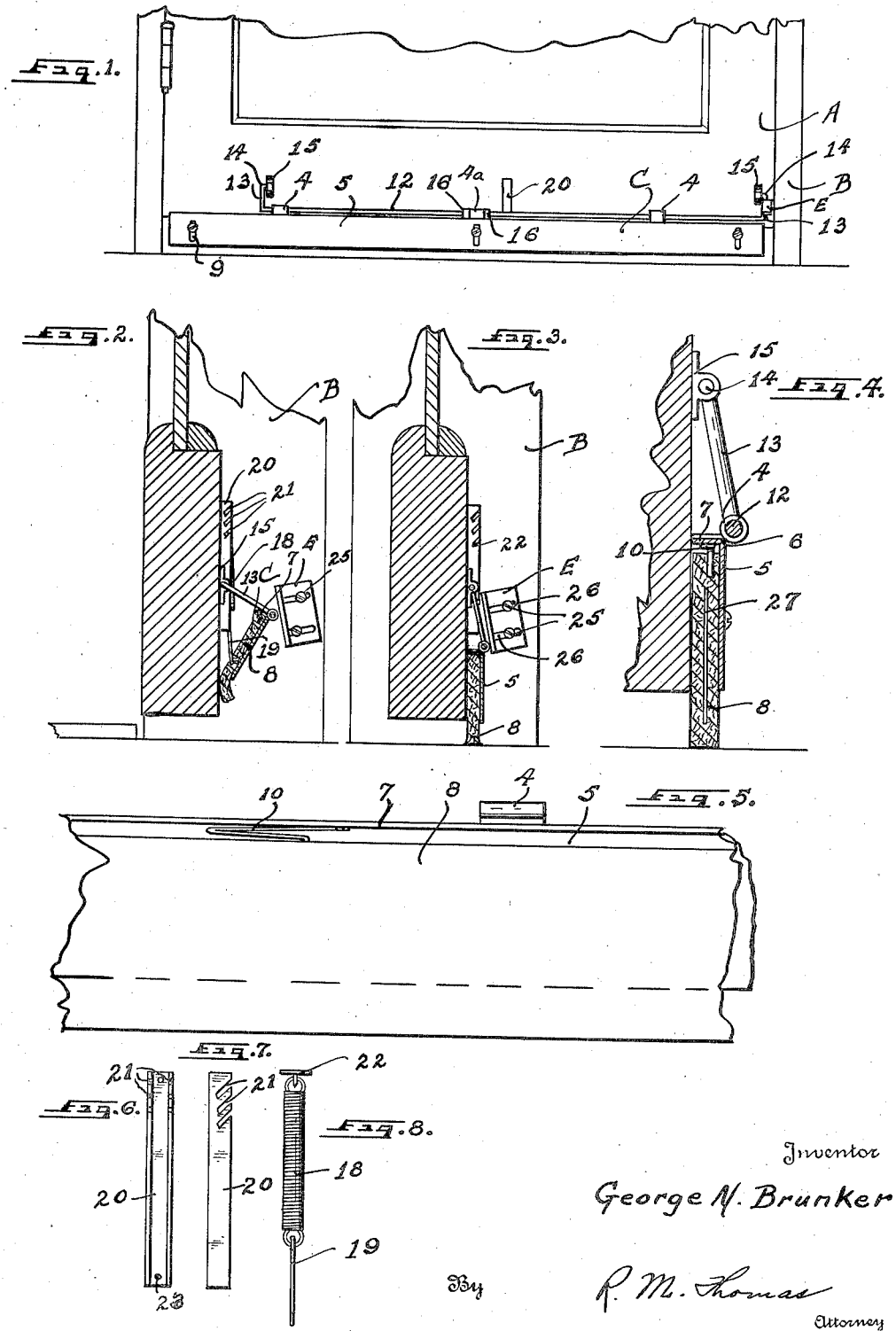
Inventor
George N. Brunker
By R. M. Thomas
Attorney Patented Aug. 16, 1938

2,126,726

UNITED STATES PATENT OFFICE 2,126,726

WEATHER STRIP FOR CLOSURES

George N. Brunker, Salt Lake City, Utah

Application December 23, 1936, Serial No. 117,271

1 Claim. (Cl. 20—67)

My invention relates to weather strips and has for its object to provide a new and efficient closure weather strip for sealing under or along the bottom of a closure.

A further object is to provide a door strip which will raise instantly when the door is opened and which will raise a distance greater than the space between the door and the door sill or flooring under the door.

A still further object is to provide a door strip which will be economical to manufacture, easy to install, and adjustable as to height so that one strip may be made to fit any distance between the door and floor.

A still further object is to provide a self actuated door strip which will be raised when the door is opened and which will be lowered into the closed position when the door is closed but, which strip will raise as soon as the door has been moved a very small fraction of the opening distance and which will be lowered to the floor quickly as soon as the door reaches a predetermined small distance from the closed position, the same bracket being used to release the raising of the strip and to lower it to the closed position.

A still further object is to provide a simple, efficient door strip, light in weight, carrying a strip of adjustably mounted felt or rubber or other suitable material for sealing the air space under the door, and which sealing material will be mounted with spring pressure between the holding strip and the sealing material, to adjust the material to any unevenness of the floor under the door or to take up wear on the door sill and still keep the air from passing under the door.

These objects I accomplish with the device illustrated in the accompanying drawing in which similar numerals and letters of reference indicate like parts throughout the several views and as described in the specification forming a part of this invention and pointed out in the appended claim.

In the drawing—

Figure 1 is a front elevation of the lower section of a door with my strip shown in place thereon in the closed position.

Figure 2 is a section on line 2—2 of Figure 1 enlarged in size, with the door shown slightly ajar and the strip raised from the floor.

Figure 3 is a section on line 3—3 of Figure 1, with the strip lowered to the floor as when the door is closed.

Figure 4 is an enlarged section of the device shown closed as in Figure 3.

Figure 5 is a rear side elevation of a portion of the strip showing the spring means for holding the strip to the floor to overcome unevenness.

Figure 6 is a view of the spring holding and adjusting bracket.

Figure 7 is a side view of Figure 6.

Figure 8 is a face view of the spring and its corresponding parts.

In the drawing I have shown the door as A, the door frame as B and my weather strip as C. The strip C is formed of a longitudinal frame or body 5 formed of an angled strip of metal having spaced apart bearing brackets formed on the top edge 7 thereof adjacent the right angled bend 6 of the strip 5. In the recess between the angled bend and the flat face of the strip I then adjustably mount my floor engaging strip of closure material 8 said material being a strip of felt, fabric, rubber, or other suitable like flexible material. This flat strip is adjustably mounted to the angle body 5 by spaced apart small bolts inserted through vertical slots 9 in the body 5 with the nut carried on the back side of the material 8 or embedded therein as desired. Between these adjusting bolts I then provide tension springs 10 said springs being adapted to press down on the top side of the material 8 and onto the underside of the flange or edge 7 and being of spring material will yieldingly hold the material 8 to any uneven surface or floor, thus taking up any leaks under the door when the device is closed.

Through the bearing brackets 4 I then mount my support and pivot bar 12, said bar being formed with the ends extended beyond the end brackets 4 and turned up at right angles at 13 with the end again turned or bent back at 14 where each turned back end is secured in a bearing 15. The two turned back ends 14 are bent toward each other so that when the bearings 15 are secured to the door by suitable means, the bar 12 cannot move longitudinally.

The brackets 4 are preferably made spaced in from each end and in the middle of the body 5, and locking rings 16 are secured by set screws or other suitable means onto the shaft 12 at each side of the middle bracket 4a so that when secured neither the bar 12 nor the body 5 may be moved longitudinally but, so that the bar may be partially rotated in the brackets and the body 5 raised when the bar is so rotated.

The means for raising the body is made of a spring 18 mounted to the body 5 by a short wire or bar 19, and to the door by a bracket, 20.

The bracket 20 consists of a channel having the two sides thereof slotted at 21 near the top end thereof and at an angle to the side walls, said slots to receive a suspension bar 22 and said suspension bar having a ring securing it to the top end of the spring 18.

The spring 18 is then adjusted by raising or lowering the bar 22 in the slots 21. Holes are provided in the bracket 20 to provide means to insert small screws through the bracket to hold the bracket to the door. The actuating means for causing the strip to be lowered to the floor when the door is closed is made of an angled bracket E secured to the door frame B preferably at the opposite side of the door frame from the hinges which support the door or in other words at the side of the frame from which the door opens. This bracket is provided with slots 26 therein through which screws are inserted to secure the bracket to the door frame at an angle to the door face and the slots are to allow for adjustment of the bracket so that it hits the bent up portion 13 of the bar 12 in the proper position for depressing it toward the door when the door is being closed.

Stiffening members 27 are inserted in the felt strip 8 for giving more rigidity if desired.

The operation of the device is as follows:

When secured to the door and adjusted as to position and with the bracket E secured to the door frame in its proper position the device is ready for use.

When the door is closed, the bent out face of the bracket E engages the end 13 of the bar 12 and causes the bar to be pivoted in the bearings 15 forcing the body 5 down and simultaneously the strip 8 toward the floor. When the door is entirely closed, the strip 8 engages the floor with sufficient pressure to close off all space thereunder. This closing of the door and lowering of the body 5 and strip 8 extends the spring 18 causing an upward draft on the body 5. When the door is opened, the upward draft of the spring on the body 5 causes the entire body and strip to raise quickly to a position sufficiently high to clear the bottom of the door the amount of raise, depending upon the position of the body 5, the felt strip 8, and the tension of the spring 18. As soon as the door has been opened a fraction of an inch the spring commences to exert its force on the body 5 and to elevate it as the instant the door is cracked the bracket E is drawn away from the end 13 of the bar 12 and allows the spring to draw the body 5 upwardly. When the door has been opened sufficient for the bracket E to be clear of the end 13, the strip will be raised to its limit and the door may then swing freely.

Having thus described my invention I desire to secure by Letters Patent and claim:

In a door strip of the class described the combination of an angled body; a weather strip sealing material carried in the angle of said body; means by spring tension to hold the strip onto an uneven surface of floor; a bar mounted in brackets on said body said bar having the ends turned up and back parallel to the main length thereof said bent back portions to act as bearing support portions; bearings mounted to said door holding the ends of said bar; means by spring tension to normally draw the body and strip away from the floor; means to adjust said spring tension; and an angled bracket to be mounted to the door frame at an angle to the door face to engage the end of the bar to force the body and strip into contact with the floor when the door is closed.

GEORGE N. BRUNKER.